(12) United States Patent
Park et al.

(10) Patent No.: US 9,085,318 B2
(45) Date of Patent: Jul. 21, 2015

(54) ELECTRIC POWER STEERING APPARATUS, MALFUNCTION JUDGING METHOD, AND CURRENT ESTIMATING METHOD

(75) Inventors: Jae Sang Park, Wongju-si (KR); Jong Kwan Kim, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 944 days.

(21) Appl. No.: 13/230,328

(22) Filed: Sep. 12, 2011

(65) Prior Publication Data

US 2012/0072077 A1 Mar. 22, 2012

(30) Foreign Application Priority Data

Sep. 16, 2010 (KR) .................. 10-2010-0090926

(51) Int. Cl.
*B62D 5/04* (2006.01)
*G01L 5/22* (2006.01)
*G01L 25/00* (2006.01)

(52) U.S. Cl.
CPC ............... *B62D 5/049* (2013.01); *G01L 5/221* (2013.01); *G01L 25/003* (2013.01)

(58) Field of Classification Search
USPC ............... 701/42, 72; 318/432–433; 388/806; 180/446, 443; 903/903
See application file for complete search history.

(56) References Cited

U.S. PATENT DOCUMENTS

| 5,670,854 | A | * | 9/1997 | Matsuura et al. ............. 318/432 |
|---|---|---|---|---|
| 5,701,066 | A | * | 12/1997 | Matsuura et al. ............. 318/808 |
| 5,828,973 | A | * | 10/1998 | Takeuchi et al. ................ 701/41 |
| 6,112,846 | A | * | 9/2000 | Mukai et al. .................. 180/446 |
| 6,370,459 | B1 | * | 4/2002 | Phillips ........................... 701/41 |
| 6,465,975 | B1 | * | 10/2002 | Naidu ............................ 318/430 |
| 6,900,607 | B2 | * | 5/2005 | Kleinau et al. ............... 318/432 |
| 7,042,227 | B2 | * | 5/2006 | Mir et al. ....................... 324/503 |
| 7,199,549 | B2 | * | 4/2007 | Kleinau et al. ............... 318/798 |
| 7,500,538 | B2 | * | 3/2009 | Hara et al. .................... 180/412 |
| 7,574,294 | B2 | * | 8/2009 | Ta et al. .......................... 701/41 |
| 7,576,506 | B2 | * | 8/2009 | Kleinau et al. ............... 318/471 |

(Continued)

FOREIGN PATENT DOCUMENTS

CN 1872605 A 12/2006
DE 199 62 186 A1 7/2000

(Continued)

OTHER PUBLICATIONS

A novel control method for reducing torque ripple in PMSM applied for Electric Power Steering; Suk-Hee Lee; Geun-Ho Lee; Sung-Il Kim; Jung-Pyo Hong; Electrical Machines and Systems, 2008. ICEMS 2008. International Conference on Publication Year: 2008, pp. 3142-3145.*

(Continued)

*Primary Examiner* — Cuong H Nguyen
(74) *Attorney, Agent, or Firm* — McDermott Will & Emery LLP

(57) ABSTRACT

Disclosed is an electric power steering apparatus. The electric power steering apparatus includes: a torque sensor configured to detect a torque applied to a steering wheel; a current detector configured to measure a current flowing through a driving motor; and an electronic control unit configured to estimate a current flowing through the driving motor depending on the detected torque and compare the estimated current with the measured current to judge a malfunction of the torque sensor or the current detector.

8 Claims, 5 Drawing Sheets

(56) References Cited

U.S. PATENT DOCUMENTS

| | | | |
|---|---|---|---|
| 8,725,357 B2* | 5/2014 | Imamura et al. | 701/42 |
| 2003/0071594 A1* | 4/2003 | Kleinau et al. | 318/567 |
| 2003/0076061 A1* | 4/2003 | Kleinau et al. | 318/432 |
| 2003/0076064 A1* | 4/2003 | Kleinau et al. | 318/567 |
| 2003/0076065 A1* | 4/2003 | Shafer et al. | 318/567 |
| 2004/0154859 A1* | 8/2004 | Kawada et al. | 180/446 |
| 2005/0156548 A1* | 7/2005 | Kawada | 318/432 |
| 2006/0181819 A1* | 8/2006 | Nomura et al. | 361/31 |
| 2007/0132446 A1* | 6/2007 | Kleinau et al. | 324/160 |
| 2007/0225885 A1* | 9/2007 | Hara et al. | 701/43 |
| 2007/0233345 A1* | 10/2007 | Endo et al. | 701/41 |
| 2008/0201041 A1* | 8/2008 | Jiang | 701/42 |
| 2012/0072077 A1* | 3/2012 | Park et al. | 701/42 |
| 2013/0158808 A1* | 6/2013 | Imamura et al. | 701/42 |
| 2014/0350795 A1* | 11/2014 | Amin et al. | 701/42 |

FOREIGN PATENT DOCUMENTS

| | | | |
|---|---|---|---|
| DE | 698 23 086 T2 | | 3/2005 |
| DE | 10 2005 011 379 A1 | | 10/2005 |
| DE | 60 2005 005 399 T2 | | 4/2009 |
| EP | 0 863 065 A2 | | 9/1998 |
| EP | 1 623 909 A2 | | 2/2006 |
| KR | 10-2006-0124577 A | | 12/2006 |
| WO | WO00/05124 | * | 2/2000 |
| WO | WO2004/106143 | * | 12/2004 |

OTHER PUBLICATIONS

A low torque ripple PMSM drive for EPS applications; Guang Liu; Kurnia, A.; De Larminat, R.; Desmond, P. ; O'Gorman, T. Applied Power Electronics Conference and Exposition, 2004. APEC '04. Nineteenth Annual IEEE; vol. 2 DOI: 10.1109/APEC.2004.1295965; Publication Year: 2004, pp. 1130-1136 vol. 2.*

Model-based fault detection and isolation for electric power steering system; Jeongjun Lee et al.; Control, Automation and Systems, 2007. ICCAS '07. Inter. Conf. on; DOI: 10.1109/ICCAS.2007.4406728; Pub. Year: 2007, pp. 2369-2374.*

NdFeB magnets for electric power steering (EPS) applications; Morcos, A.C.; Brown, D.N.; Campbell, P.; Magnetics Conference, 2002. INTERMAG Europe 2002. Digest of Technical Papers. 2002 IEEE Inter.; DOI: 10.1109/INTMAG.2002.1001358 Publication Year: 2002.*

Two-level backward operation of a VSMC for PMSG grid-connected variable speed wind turbine systems; Aner, M.; Nowicki, E. Electric Machines & Drives Conference (IEMDC), 2011 IEEE International; DOI: 10.1109/IEMDC.2011.5994755; Publication Year: 2011, pp. 1100-1106.*

A comparative study of sensorless control techniques of interior permanent magnet synchronous motor drives for electric vehicles Taghavi, S.M.; Jain, M.; Williamson, S.S.;Vehicle Power and Propulsion Conference (VPPC), 2011 IEEE; DOI: 10.1109/VPPC.2011.6043206; Publication Year: 2011, pp. 1-7.*

Yaw rate control of electric vehicle using steer-by-wire system; Hosaka, M.; Murakami, T.; Advanced Motion Control, 2004. AMC '04. The 8th IEEE International Workshop on; DOI: 10.1109/AMC.2004.1297636; Publication Year: 2004, pp. 31-34.*

Chinese Office Action, w/ English translation thereof, issued in Chinese Patent Application No. CN 201110269375.4 dated Aug. 30, 2013.

Korean Office Action issued in Korean Patent Application No. KR 10-2010-0090926 dated Jun. 21, 2012.

German Office Action, w/ English translation thereof, issued in German Patent Application No. DE 10 2011 111 948.9 dated May 21, 2012.

* cited by examiner

ELECTRIC POWER STEERING APPARATUS, MALFUNCTION JUDGING METHOD, AND CURRENT ESTIMATING METHOD

CROSS-REFERENCE TO RELATED APPLICATION

This application claims priority from and the benefit under 35 U.S.C. §119(a) of Korean Patent Application No. 10-2010-0090926, filed on Sep. 16, 2010, which is hereby incorporated by reference for all purposes as if fully set forth herein.

BACKGROUND OF THE INVENTION

1. Field of the Invention

The present invention relates to an electric power steering apparatus.

2. Description of the Prior Art

As generally known in the art, a vehicle includes a power steering apparatus for reducing a steering power of a steering wheel (handle) to secure steering safety. There are a variety of types of power steering apparatuses, and electric power steering apparatuses are recently being distributed to help a steering operation of a driver using a rotating force of a motor.

Such an electric power steering apparatus provides a light and comfortable steering feeling during a low-speed driving condition and provides a heavy steering feeling and an excellent directional stability during a high-speed driving condition by allowing an electronic control unit to drive a motor depending on a driving condition of a vehicle.

It is important to suitably control a current flowing through a motor because the electric power steering apparatus assists a steering force through driving of the motor. Accordingly, studies on accurate control of a current flowing through a motor of an electric power steering apparatus are increasingly made.

SUMMARY OF THE INVENTION

Accordingly, the present invention has been made to solve the above-mentioned problems occurring in the prior art, and an aspect of the present invention provides an electronic power steering apparatus which copes with an abnormal operation of a torque sensor or a current detector.

According to an aspect of the present invention, there is provided an electric power steering apparatus including: a torque sensor configured to detect a torque applied to a steering wheel; a current detector configured to measure a current flowing through the driving motor; and an electronic control unit configured to estimate a current flowing through the driving motor depending on the detected torque and compare the estimated current with the measured current to judge a malfunction of the torque sensor or the current detector.

According to another aspect of the present invention, there is provided a method for judging a malfunction in an electric power steering apparatus, the method comprising the steps of: detecting a torque applied to a steering wheel through a torque sensor; measuring a current flowing through a driving motor through a current detector; estimating a current flowing through a driving motor depending on the torque detected by an electronic control unit; and comparing the measured value of the current flowing through the driving motor with the estimated value of the current flowing through the driving motor to judge a malfunction of the torque sensor or the current detector.

According to a further aspect of the present invention, there is provided a method of estimating a current flowing through a driving motor by an electronic control unit, the method comprising the steps of: receiving a detected value of a torque applied to a steering wheel from a torque sensor; determining an angular speed of the steering wheel depending on the detected value of the torque; calculating an angular speed of the driving motor based on an angular speed of the steering wheel and a gear ratio of a reducer; and estimating a current flowing through the driving motor based on a voltage across the driving motor, a back EMF constant of the driving motor, a resistance of the driving motor, and an angular speed of the driving motor.

As mentioned above, the present invention can stop an operation of an electric power steering apparatus when a difference between a measured current and an estimated current is greater than a critical value.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
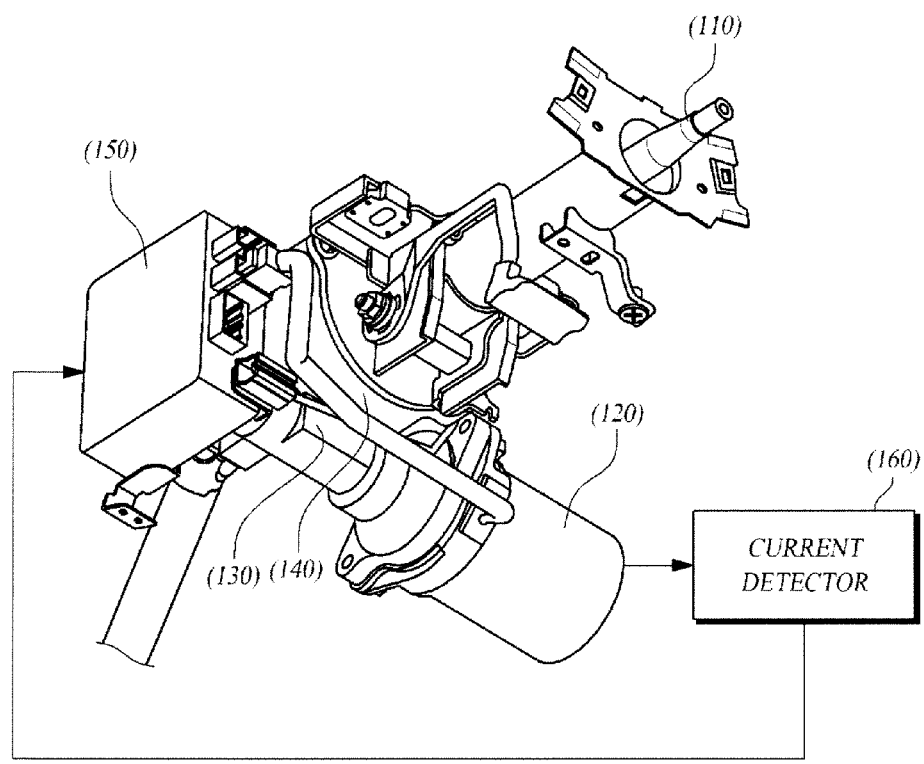
FIGS. 1 and 2 illustrate an electric power steering apparatus according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
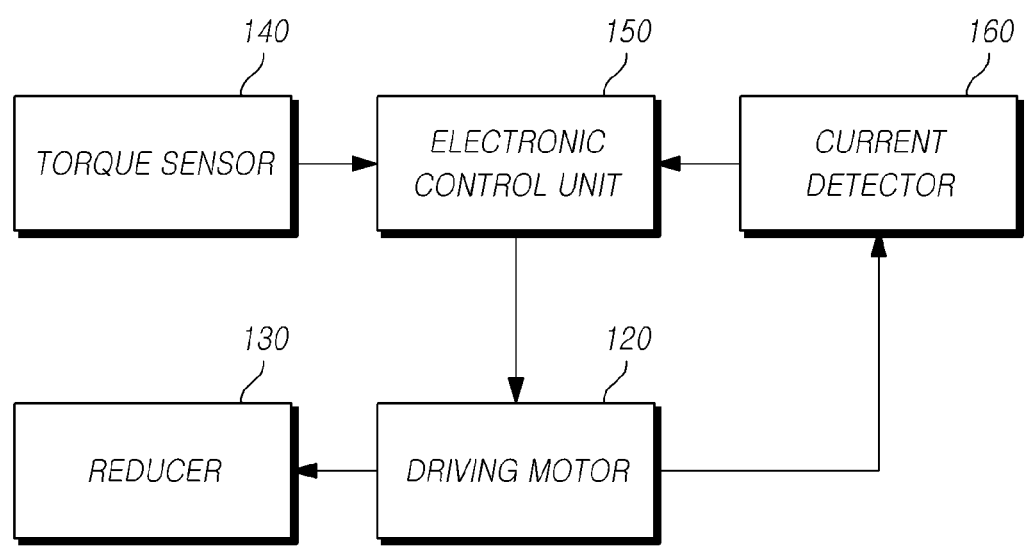

FIGS. 1 and 2 illustrate an electric power steering apparatus according to an embodiment of the present invention.

Referring to FIGS. 1 and 2, the electric power steering apparatus according to the embodiment of the present invention includes a torque sensor 140 configured to detect a torque applied to a steering wheel (not shown), a current detector 160 configured to measure a current flowing through a driving motor 120, and an electronic control unit 150 configured to estimate a current flowing through the driving motor 120 depending on the detected torque and compare the estimated current with the measured current to judge a malfunction of the torque sensor 140 or the current detector 160. Hereinafter, the electric power steering apparatus according to the embodiment of the present invention will be described in more detail.

One end of an input shaft 110 is coupled to the steering wheel installed near a seat of a driver, and the input shaft 110 is connected to an output shaft (not shown) through a torsion bar. The driving motor 120 is installed to be inclined from the input shaft 110 at a certain angle to supply an auxiliary steering force.

A reducer 130 includes a driving gear and a driven gear, and is connected to one end of a rotary shaft of the driving motor 120 and to one end of the output shaft to transmit a driving force of the driving motor 120 to the output shaft.

The torsion bar is twisted by the relative rotation of the input shaft 110 and the output shaft, and the torque sensor 140 is located between the input shaft 110 and the output shaft to detect a twisted angle of the torsion bar and output a torque sensing signal.

The electronic control unit 150 receives a torque sensing signal from the torque sensor 140, determines a torque applied to the steering wheel, and determines an estimated current of the driving motor 120 depending on the torque.

The current detector 160 detects a current flowing through the driving motor 120 and outputs a current detection signal to the electronic control unit 150, and the electronic control unit 150 receives the current detection signal and determines a magnitude of a measured current flowing through the driving motor 120. The current detector 160 may include a hall sensor or a shunt resistor.

Then, the electronic control unit 150 compares a magnitude of a measured current flowing through the driving motor 120 with a magnitude of an estimated current of the driving motor 120 obtained through calculation, and checks a malfunction of the torque sensor 140 or the current detector 160.

Hereinafter, a process of calculating an estimated current of the driving motor 120 will be described in detail.

A relation between an estimated current and a voltage of the driving motor 120 can be expressed in Equation (1).

$$Vm = Rm \times Im + Ke \times Wm \tag{1}$$

Vm: Voltage across the driving motor
Rm: Resistance of the driving motor
Im: Estimated current of the driving motor
Ke: Back EMF constant of the driving motor
Wm: Angular speed of the driving motor An estimated current of the driving motor 120 may be calculated in Equation (2) based on Equation (1).

$$Im = (Vm - Ke \times Wm)/Rm \tag{2}$$

Then, since a voltage Vm across the driving motor 120, a resistance Rm of the driving motor 120, and a back EMF constant Ke of the driving motor 120 are constant, a current flowing through the driving motor 120 can be calculated based on an angular speed Wm of the driving motor 120.

An angular speed Wm of the driving motor 120 can be obtained through Equation (3).

$$Wm = Ws \times Kg \tag{3}$$

Ws: Angular speed of the steering wheel
Kg: Gear ratio of the reducer

Since an angular speed Ws of the steering wheel can be calculated through a torque applied to the steering wheel and a gear ratio Kg of the reducer has been determined in advance, an angular speed of the driving motor 120 can be calculated through Equation (3). That is, the electronic control unit 150 can determine an angular speed of the driving motor 120 through an angular speed of the steering wheel and a gear ratio of the reducer 130.

According to the embodiment of the present invention, the electronic control unit 150 can calculate an estimated current Im of the driving motor 120 through Equations (1) to (3), and can store a table where estimated currents Im of the driving motor 120 based on angular speeds of the driving motor 120 are mapped or a table where estimated currents Im of the driving motor 120 based on torques applied to the steering wheel are mapped. The electronic control unit 150 can determine an estimated current Im based on an angular speed Wm or a torque using the stored table and without calculation.

Hereinafter, an operation of the electric power steering apparatus according to the embodiment of the present invention will be described in detail.

Figure 3:
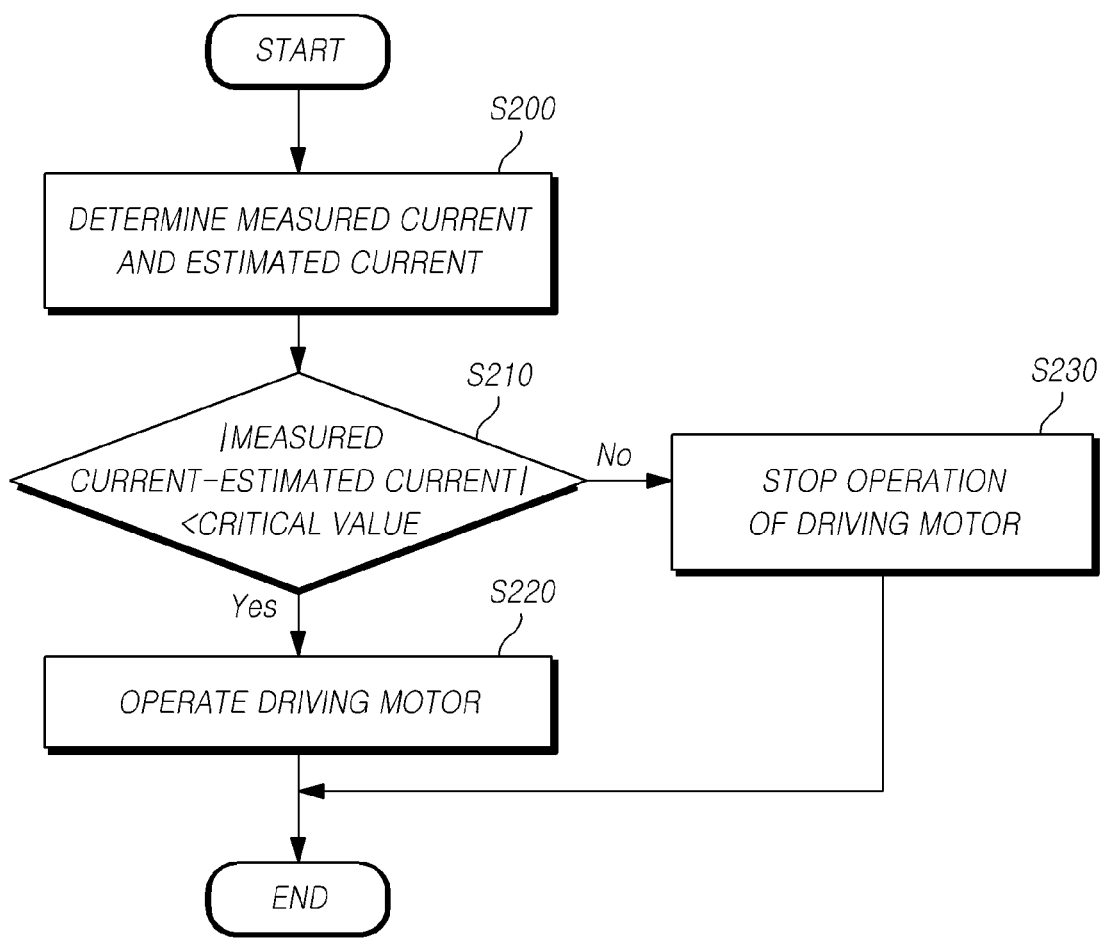
FIG. 3 is a flowchart of an operation of the electric power steering apparatus according to the embodiment of the present invention.

FIG. 3 is a flowchart illustrating an operation of the electric power steering apparatus according to the embodiment of the present invention.

The electronic control unit 150 determines a measured current of the driving motor 120 based on a current detection signal input from the current detector 160, and determines an estimated current of the driving motor 120 through a torque corresponding to a torque sensing signal input from the torque sensor 140 (S200).

The electronic control unit 150 compares a measured current of the driving motor 120 determined based on a current detection signal input from the current detector 160 with an estimated current of the driving motor 120 determined through a torque corresponding to a torque sensing signal input from the torque sensor 140, and determines whether a difference between the measured current and the estimated current is smaller than a critical value (S210). The calculation of an estimated current has been described above, and a detailed description thereof will be omitted.

If the electronic control unit 150 determines that a difference between a measured current and an estimated current is smaller than a critical value, the electronic control unit 150 supplies a current to the driving motor 120 (S220).

If the electronic control unit 150 determines that a difference between a measured current and an estimated current is greater than a critical value, the electronic control unit 150 stops supplying a current to the driving motor 120 (S230).

That is, when a difference between a measured current and an estimated current is greater than a critical value, there is a high possibility of an abnormal operation of the torque sensor 140 and the current detector 160.

Thus, the electric power steering apparatus according to the embodiment of the present invention can cope with an abnormal operation of the torque sensor 140 or the current detector 160 by stopping the supply of a current to the driving motor 120 when a difference between a measured current and an estimated current is greater than a critical value.

Figure 4:
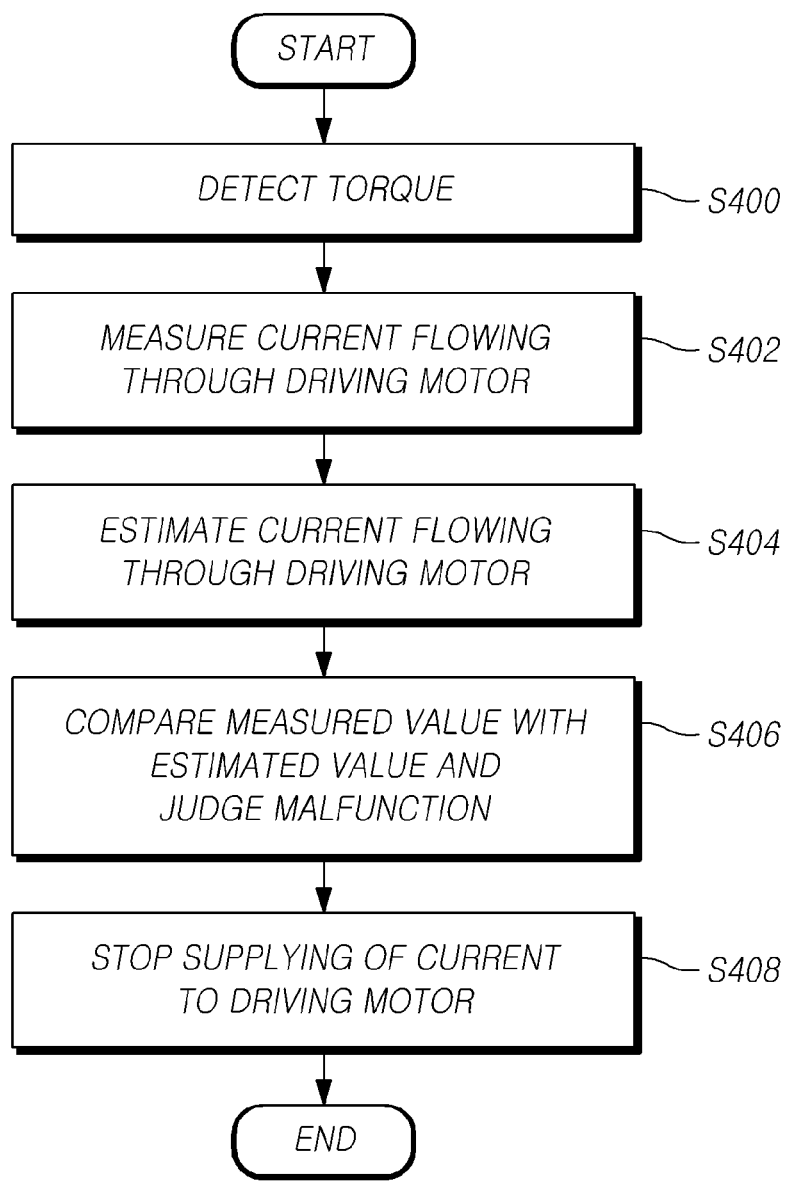
FIG. 4 is a flowchart illustrating a method of judging a malfunction of an electric power steering apparatus according to an embodiment of the present invention.

FIG. 4 is a flowchart illustrating a method of judging a malfunction in an electric power steering apparatus according to an embodiment of the present invention.

Referring to FIG. 4, the method of judging a malfunction in an electric power steering apparatus according to the embodiment of the present invention includes the steps of detecting a torque applied to a steering wheel through a torque sensor 140 (S400), measuring a current flowing through a driving motor 120 through a current detector 160 (S402), estimating a current flowing through a driving motor 120 depending on the torque detected by an electronic control unit 150 (S404), and comparing the measured value (measured current) of the current flowing through the driving motor 120 with the estimated value (measured current) of the current flowing through the driving motor 120 to judge a malfunction of the torque sensor 140 or the current detector 160 (S406).

In step S406, if a difference between the measured value (measured current) of the current flowing through the driving motor 120 and the estimated value (estimated current) is larger than a critical value, it is determined that the torque sensor 140 or the current detector 160 malfunctions.

Referring to FIG. 4, the method of judging a malfunction in an electric power steering apparatus according to the embodiment of the present invention may further include the step of performing a controlling operation so that the supplying of the current to the driving motor 120 is stopped when the torque sensor 140 or the current detector 160 is determined to malfunction after step S406 (S408).

Figure 5:
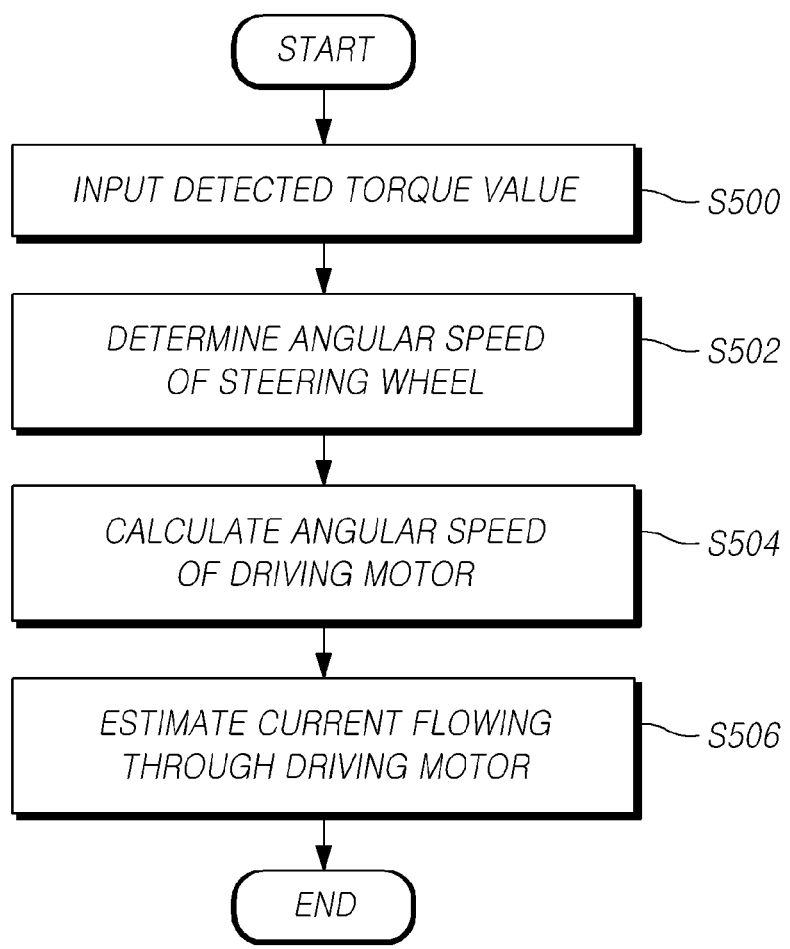
FIG. 5 is a flowchart illustrating a method of estimating a current flowing through a driving motor.

FIG. 5 is a flowchart illustrating a method of estimating a current flowing through a driving motor 120 by an electronic control unit 150 in an electronic power steering apparatus according to an embodiment of the present invention.

Referring to FIG. 5, the method of estimating a current flowing through a driving motor 120 by an electronic control unit 150 in an electronic power steering apparatus according to the embodiment of the present invention includes the steps of receiving a detected value of a torque applied to a steering wheel from a torque sensor 140 (S500), determining an angular speed of the steering wheel depending on the detected value of the torque (S502), calculating an angular speed of the driving motor 120 based on an angular speed of the steering wheel and a gear ratio of a reducer 130 (S504), and estimating a current flowing through the driving motor 120 based on a voltage Vm across the driving motor 120, a back EMF constant of the driving motor 120, a resistance of the driving motor 120, and an angular speed of the driving motor 120 (S506).

In step S506, the electronic control unit 150 can calculate an estimated value (estimated current) Im of the current flowing through the driving motor 120 using Equation (2).

In step S504, the electronic control unit 150 can calculate an angular speed Wm of the driving motor 120 using Equation (3).

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardware. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An electric power steering apparatus comprising:
   a torque sensor configured to detect a torque applied to a steering wheel;
   a current detector configured to measure a current flowing through a driving motor; and
   an electronic control unit configured to estimate a current flowing through the driving motor based on the detected torque and compare the estimated current with the measured current to determined a malfunction of the torque sensor or the current detector,
   wherein the electronic control unit calculates the current flowing through the driving motor by receiving a detected torque value from the torque sensor, by determining an angular speed of the steering wheel based on the detected torque value, by calculating an angular speed of the driving motor based on the angular speed of the steering wheel and a gear ratio of a reducer, and by estimating the current flowing through the driving motor based on a voltage across the driving motor, a back EMF constant of the driving motor, a resistance of the driving motor, and an angular speed of the driving motor.

2. A method for judging a malfunction in an electric power steering apparatus, the method comprising steps of:
   detecting a torque applied to a steering wheel through a torque sensor;
   measuring a current flowing through a driving motor through a current detector;
   estimating a current flowing through the driving motor based on the torque detected by an electronic control unit; and
   comparing a measured current value with an estimated current value to determine a malfunction of the torque sensor or the current detector,
   wherein the step of estimating the current flowing through the driving motor includes steps of:
     receiving a detected torque value from the torque sensor;
     determining an angular speed of the steering wheel based on the detected torque value;
     calculating an angular speed of the driving motor based on the angular speed of the steering wheel and a gear ratio of a reducer; and
     estimating the current flowing through the driving motor based on a voltage across the driving motor, a back EMF constant of the driving motor, a resistance of the driving motor, and the angular speed of the driving motor.

3. The electric power steering apparatus as claimed in claim 1, wherein the electronic control unit determines the angular speed of the steering wheel calculated through the detected torque, checks the gear ratio of the reducer for transmitting a driving force of the driving motor to an output shaft coupled to an input shaft coupled to the steering wheel through a torsion bar, and determines the angular speed of the driving motor based on the angular speed of the steering wheel and the gear ratio of the reducer.

4. The method as claimed in claim 2, further comprising the step of performing a controlling operation so that the supplying of the current to the driving motor is stopped when the torque sensor or the current detector is determined to malfunction after the step of judging the malfunction.

5. The electronic power steering apparatus as claimed in claim 1, wherein if a difference between an estimated current value and a measured current value is greater than a critical value, the electronic control unit determines that the torque sensor or the current detector malfunctions.

6. The electric power steering apparatus as claimed in claim 5, wherein when it is determined that the torque sensor or the current detector a functions, the electronic control unit performs a controlling operation so that the supplying of the current to the driving motor is stopped.

7. The electric power steering apparatus as claimed in claim 1, wherein the current detector measures the current flowing through the driving motor using a hall sensor or a shunt resistor.

8. The method as claimed in claim 2, wherein in the step of judging the malfunction, when a difference between the measured current value and the estimated current value is greater than a critical value, the torque sensor or the current detector is determined to malfunction.

* * * * *